United States Patent [19]

Wallace

[11] Patent Number: 4,855,081

[45] Date of Patent: Aug. 8, 1989

[54] METHOD FOR DECONTAMINATING CONVENTIONAL PLASTIC MATERIALS WHICH HAVE BECOME RADIOACTIVELY CONTAMINATED, AND ARTICLES

[75] Inventor: James M. Wallace, Gainesville, Ga.

[73] Assignee: Nutech, Inc., San Jose, Calif.

[21] Appl. No.: 203,420

[22] Filed: Jun. 7, 1988

[51] Int. Cl.[4] .......................... G21F 9/08; G21F 9/16; C02F 1/42; B01D 11/00

[52] U.S. Cl. .................................... 252/626; 210/663; 210/682; 210/751; 210/800; 252/628; 252/631; 252/634; 423/6; 423/8; 423/DIG. 14

[58] Field of Search ............... 252/626, 631, 634, 628; 423/4, 6, 8, 11; 134/2, 3, 4, 10, 22.14, 22.19; 210/663, 682, 751, 800, 801, 532.1

[56] References Cited

U.S. PATENT DOCUMENTS

| | | | |
|---|---|---|---|
| 2,780,532 | 2/1957 | Hainer et al. | 423/8 |
| 2,839,357 | 6/1958 | Clark et al. | 423/8 |
| 2,849,277 | 8/1958 | Thomas | 423/8 |
| 2,864,664 | 12/1958 | Spence et al. | 423/8 |
| 2,874,025 | 2/1959 | Moore | 423/8 |
| 2,893,822 | 7/1959 | Hyman | 423/8 |
| 2,895,791 | 7/1959 | Van Winkle | 423/8 |
| 2,905,525 | 9/1959 | Dawson | 423/8 |
| 2,918,349 | 12/1959 | Seaborg | 423/4 |
| 3,737,513 | 6/1973 | Wiewiorowski et al. | 423/4 |
| 3,954,654 | 5/1976 | Bernard | 423/8 |
| 4,241,027 | 12/1980 | Bowerman et al. | 423/10 |
| 4,275,037 | 6/1981 | Friedland et al. | 423/8 |
| 4,293,438 | 10/1981 | Ledebrink et al. | 252/301.1 |
| 4,332,776 | 6/1982 | Stana | 423/8 |
| 4,350,620 | 9/1982 | Hartinger et al. | 252/628 |
| 4,371,505 | 2/1983 | Pautrot | 423/8 |
| 4,404,130 | 9/1983 | Fitoussi et al. | 252/631 |
| 4,478,804 | 10/1984 | Watanabe | 423/259 |
| 4,642,186 | 2/1987 | Nakamura | 210/257.1 |
| 4,659,551 | 4/1987 | Kolarik et al. | 423/10 |
| 4,770,783 | 9/1988 | Gustavsson et al. | 210/638 |

OTHER PUBLICATIONS

Hawley, G., 1981, The Condensed Chemical Dictionary-10th edition, Van Nostrand Reinhold Company, New York, pp. 678-679, 682.

*Primary Examiner*—Howard J. Locker
*Attorney, Agent, or Firm*—Fliesler, Dubb, Meyer & Lovejoy

[57] ABSTRACT

A method 20 for decontaminating plastic products and materials which have become radioactively contaminated. The treatment method 20 involves dissolving such plastics in a dissolution tank 28 in an organic solvent and treating the resulting solution by a solvent extraction technique in column 36 to remove particulate and dissolved radioactive contaminants from the plastic. The contaminants can be buried in a low level radioactive waste site and the separated plastic material can be disposed of in a sanitary landfill or recycled into other plastic products.

13 Claims, 3 Drawing Sheets

SOLVENT EXTRACTION TEST RESULTS

TEST 2

METHOD FOR DECONTAMINATING CONVENTIONAL PLASTIC MATERIALS WHICH HAVE BECOME RADIOACTIVELY CONTAMINATED, AND ARTICLES

FIELD OF THE INVENTION

The present invention is directed to a method for decontaminating conventional plastic materials which are used as disposable protective surfaces in an environment where the plastic materials can become radioactively contaminated.

BACKGROUND OF THE INVENTION

The nuclear power industry, medical institutions, DOE facilities, and research and academic institutions generate a considerable quantity of low level dry radioactively contaminated trash (low level dry active waste) each year. A good percentage of this trash consists of plastic material or material which could be replaced by plastic. Such plastic material can include polyvinylchloride (PVC), polyethylene (PE), polypropylene, polystyrene and others. Polyvinylchloride and polyethylene are of particular interest due to their widespread use in the nuclear industry. Currently, such plastic material which is of a sufficiently low activity level is disposed of by shallow land burial i a controlled facility designed for such waste disposal. Such disposal facilities have become increasingly unpopular, and as a result of the strict regulations regarding the design and operation of such facilities, the cost of burial has escalated tremendously in recent years. Therefore, many strategies and techniques have been devised to incinerate, compact, or otherwise reduce the volume of material which must be disposed of at such low level waste burial facilities.

Plastic materials which are subject to becoming contaminated in the above environment range widely from clothing used to protect personnel, to cloths, drapes and coatings used to protect walls, floors, structures and equipment, and to actual structural elements and equipment.

The methods currently employed for reducing the volume of dry active waste include: (1) Compaction and Supercompaction, (2) Incineration, (3) Segregation, and (4) Miscellaneous washing or laundering processes.

The compaction and segregation processes attempt to physically reduce the volume of a given quantity of waste by the application of high pressure or by segregating individual pieces of the waste which can be identified as having an acceptably low level of radioactivity so as to be considered releasable to the environment.

The incineration process attempts to reduce the volume of waste by oxidizing all of the combustible components in the waste, thereby leaving a condensed and concentrated residue. The washing and laundering processes are used primarily for clothing materials as a method for reducing the contamination levels between uses. Some attempts have been made to launder plastic materials prior to disposal, however, these attempts have met with little success as regards to significant volume reduction.

Much knowledge of the characteristics of dry active waste is available in the literature. Characteristics which are of importance in devising a disposal method include (1) isotope composition, (2) particle size distribution, (3) soluble/insoluble proportions, and (4) chemical forms.

Due to the shipping and burial requirements for radioactive material, a great deal of isotopic distribution data is available in the literature. Although the numbers vary widely from year to year and from plant to plant, the predominant isotopes which account for the majority of the activity are Co-58 and Co-60 (Cobalt isotopes), Fe-55 (Iron isotopes), and Cs-134 and Cs-137 (Cesium isotopes). Cobalt-60 alone generally accounts for 40%-60% of the activity and is by far the most important contributor. Most of these isotopes are found in the form of salts and particulate oxides.

Further data shows that the particle size generally ranges from 0.1 to 5 microns. Of the identified isotopes the cobalt isotopes are generally insoluble while the cesium isotopes are generally soluble.

SUMMARY OF THE INVENTION

The present invention is directed toward solving the outstanding problem of reducing the volume of plastic dry active waste which must presently be buried in a licensed waste disposal facility.

The present invention utilizes the dissolution of the contaminated plastic materials or material replaceable by plastic in order to separate the radioactive material from the substrate. Dissolution occurs in an organic solvent.

Following dissolution the feed or effluent steam is operated on to separate contaminants from the plastic materials in order to be able to dispose of the contaminants in an efficient manner with a reduced volume. The plastics material can then be disposed of conventionally or reprocessed into other plastic product for reuse.

Accordingly an object of the present invention is directed to a method of decontaminating plastic materials which have become radioactively contaminated in order to reduce the volume of material which must be disposed.

Another object of the present invention is to provide a method for treating contaminated plastic material to reduce the contamination level on the plastic material.

Still another object of the present invention is to provide a method for treating contaminated plastic materials to remove the radioactive substances from the plastic material such that the plastic material is suitable for reuse.

Another object of the invention is to select appropriate plastic materials that are readily dissolved in an organic solution such that the resulting feed or effluent stream can be operated on in order to segregate contaminants from the plastic materials.

In accordance with the principles of the present invention, the activity level of low level dry active waste plastic material can be reduced to sufficiently low levels as to be considered releasable to the environment by treatment of such plastics with an organic solvent succeeded by contacting in a solvent extraction process to remove the radioactive material from the organic phase.

DETAILED DESCRIPTION OF THE PREFERRED EMBODIMENT

Figure 1:
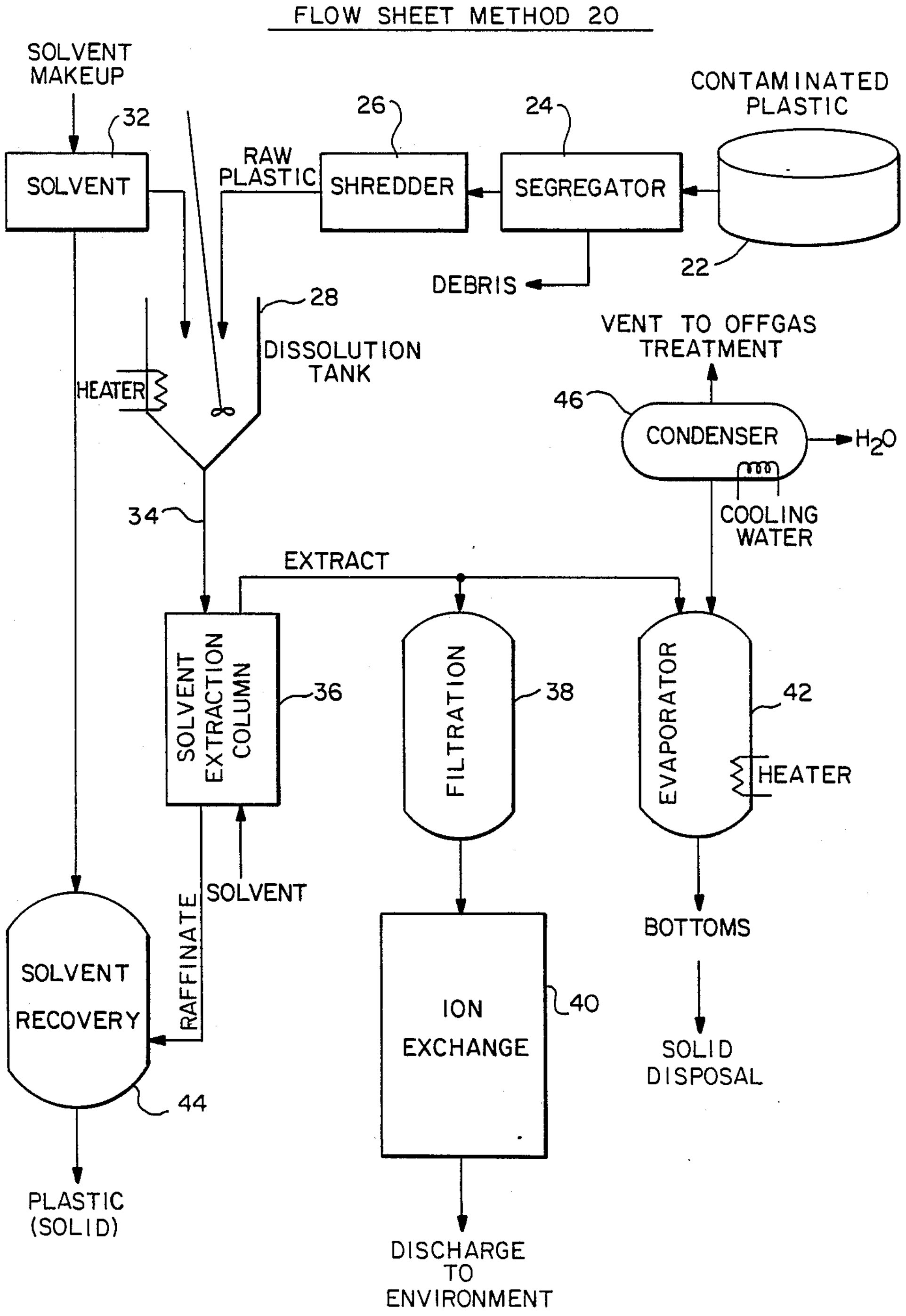
FIG. 1 depicts an embodiment of the decontamination process of the invention.

An embodiment of the method of the invention is depicted in FIG. 1 and denoted by the number 20. The method contemplates the use of plastics for use in clothing, coverings, structures and equipment meant to be used where such plastics will become radioactively contaminated. The method also contemplates, in a preferred embodiment, plastics that are soluble in organic solvents.

Before proceeding to the full description of the method as depicted in FIG. 1, it is to be understood that the method of the invention includes reducing the activity level of low level dry active waste plastic materials to sufficiently low levels as to be considered releasable to the environment by treatment of such plastics with an organic solvent followed by a solvent extraction process to remove the radioactive materials from the organic phase. The distribution of the radioactive materials between the organic and aqueous phases is sufficiently weighted toward the aqueous phase that by contacting the solutions in one or more batch-wise stages or in a continuous contacting apparatus, the organic phase will become sufficiently low in activity level as to be considered releasable to the environment with regards to the radioactive isotope concentration levels. The resulting aqueous phase (ie. extract, FIG. 1) can be treated by conventional, state of the art water treatment technology in order to concentrate the radioactivity for disposal in, for example, a shallow land-burial facility. Treatment methods can include filtration, ion exchange, and evaporation followed by incorporation in a bitumen or concrete matrix or disposal in a high-integrity container. The product organic phase (ie. raffinate, FIG. 1), may be treated to recover and separate the organic solvent and plastic. The recovered plastic may be disposed of as non-contaminated material or further processed into plastic articles and materials for reuse.

Turning to FIG. 1, the method 20 of the invention is depicted. The method includes initially collecting the contaminated plastic materials at collection point 22. These plastic materials will include for the most part polyvinylchloride, polyethylene, polypropylene and polystyrene products. Other plastic materials may also become contaminated and require disposal. Once these materials are collected, they are provided to a segregator 24 which by various techniques separates the plastic components from the non-plastic components. The non-plastic components are disposed of by other means known in the nuclear industry. The plastic material is then shredded at shredder 26 and provided to a heated dissolution tank 28. Into dissolution tank 28 an appropriate organic solvent is introduced by solvent dispenser 32. This solvent is mixed with the shredded plastic and the mixture is heated by heater 30 in order to dissolve the plastic in the solvent and provide a feed stream to a solvent extraction column 36. In the solvent extraction column 36, the plastic material, being dissolved in an organic solvent, can be contacted with an aqueous solvent in order to remove the solute or extract (radioactive particulate and soluble matter) from the organic phase, thus leaving a contamination-free plastic in the organic phase. Since most of the particulate matter is a combination of ordinary dirt, dust and iron oxides, this material, being of relatively high density, will tend toward the heavier or aqueous phase. The dissolved radioactive species, being virtually all metal cations will have a much high affinity for the more polar or aqueous phase as well.

In a preferred embodiment, the solvent extraction column 36 will include a continuous column solvent extraction unit with counter-current flow of the continuous aqueous phase feed from the top and the organic discontinuous phase feed from the bottom. This arrangement gives the advantage of having the heavy particulate settle out to the bottom of the column where they would be carried away with the aqueous phase for treatment by conventional water-treatment techniques as discussed below. As can be seen in FIG. 1, the extract or radioactive solute can be provided to filtration stage 38 and an ion exchange stage or adsorption stage 40. These stages remove insoluble and soluble contaminate respectively, discharging a concentrated contaminate which can be disposed of properly, and water which can be released to the environment. This extract can also be provided to an evaporator 42 where the water is boiled off and condensed for reuse, in condensor 46 and the bottoms are disposed in a low level disposal facility as is known in the industry.

The product organic phase from the solvent extraction column 36, otherwise known as a raffinate, is provided to a solvent recovery station 44 where the plastic is recovered and disposed of in a sanitary land-fill or recycled, and the solvent is recycled back to the dissolution tank 28 and used with make-up solvent as required in order to dissolve additional raw plastic.

EXAMPLE

Polyvinylchloride, PVC, is a common thermoplastic material which is used in the nuclear power industry and elsewhere in the forms of plastic bags, laydown cloth, sheathing material and others. PVC is dissolved in an organic solvent such as methyl isobutyl ketone, MiBK, to produce an opaque but relatively non-viscous solution. This solution is contacted stagewise in a mixer-settler with an aqueous solvent such as a mild hydrochloric acid or other acid solution. With adequate mixing, mass transfer occurs between the two phases such that any dissolved ionic material which was initially on the plastic material, and became dissolved in the organic phase, is redistributed between the two phases according to the preference of the particular ionic species for the more polar aqueous phase.

The above example indicates one selected organic solvent which can be used with polyvinylchloride. Other solvents which can be used are listed below in Table 1. Table 2 below lists plastics solubility test results when these organic solvents are used on polyvinylchloride and polyethylene, which as indicated above are two of the most common plastics used in the nuclear industry.

TABLE 1

| SOLVENT GROUP | SOLVENT |
|---|---|
| Aromatic compounds | Benzene, toluene |
| Chlorinated hydrocarbons | $CCl_4$ |
| Aliphatic hydrocarbons | N—dodecane, cyclohexane |
| Ketones | Methyl Ethyl Ketone (MEK), Methyl Isobutyl Ketone (MiBK), and other higher order ketones |

TABLE 2

| | | PLASTIC SAMPLES | |
|---|---|---|---|
| SOLVENT GROUP | SOLVENT | POLYETHYLENE | PVC |
| Aromatic | Benzene | Yes | No |
| Compounds | Toluene | No | — |
| Aliphatic | Cyclohexane | Yes | No |
| Hydrocarbons | N—dodecane | No | — |
| Chlorinated Hydrocarbons | $CCl_4$ | Yes | No |
| Ketones | MEK | No | Yes |
| | MIBK | — | Yes |

The "Yes" and "No" Table 2 refers to whether the plastic did or did not dissolve in the solvent.

Table 2, polyethylene dissolved in three different solvents in three different categories, while the PVC dissolved in only one of the solvent categories tested. The most promising of these is the cyclohexane for polyethylene and the ketones for PVC. The other two solvents, benzene and carbon tetrachloride, which were successful at dissolving polyethylene, are both hazardous chemicals and are preferably avoided when possible in industrial applications.

Figure 2:
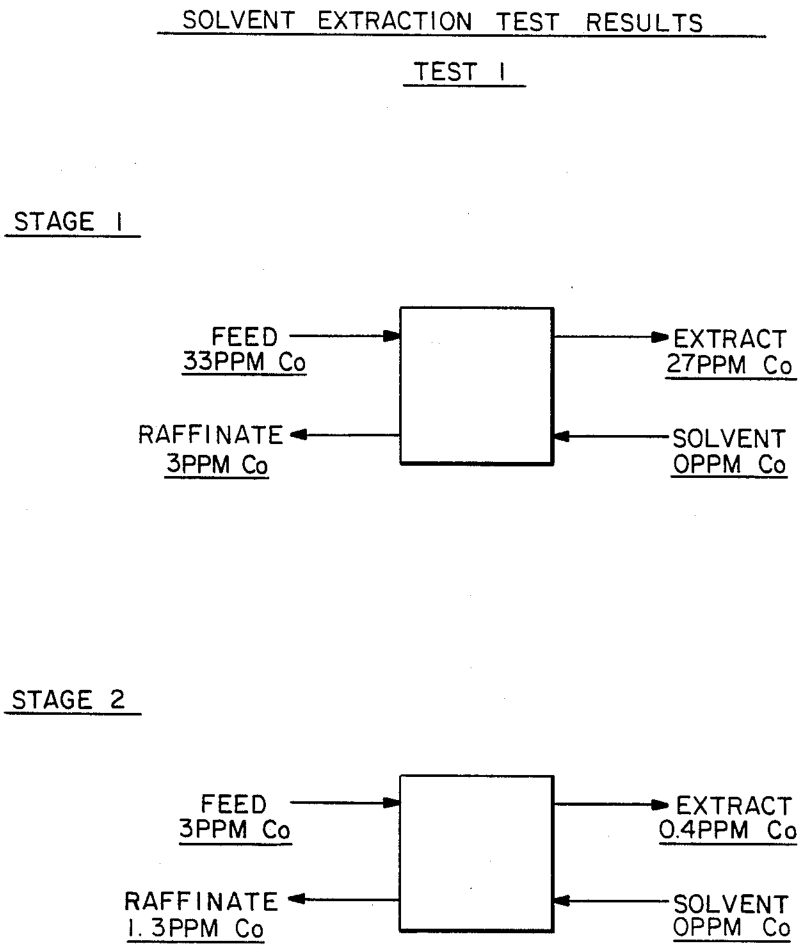
FIGS. 2 and 3 depict plastic solvent extraction test results.
Figure 3:
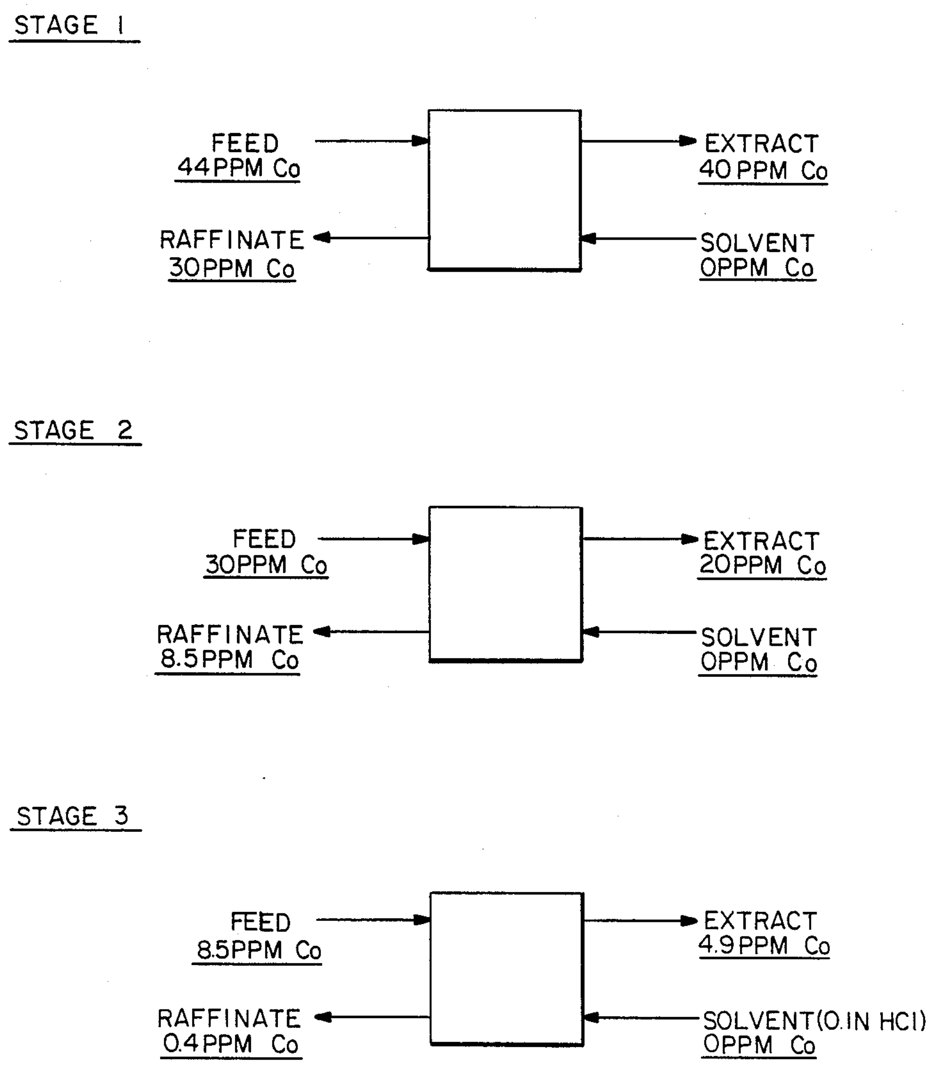

Solvent extraction tests were performed using simple mixer-settler type equipment utilizing separatory funnels. Solutions of plastic dissolved in an organic solvent along with traces of soluble cobalt were contacted with aqueous solvents. Atomic absorption analysis was performed on the extract and raffinate samples to determine the effectiveness of the extraction process. The results of this test are depicted in FIGS. 2 and 3. The data on these figures indicates that there is a significant decontamination factor which can be realized from this process wherein the decontamination factor or, DF is defined as the ratio of the initial radioactivity level divided by the final radioactivity level. FIG. 2 depicts a two-stage extraction test and FIG. 3 depicts a three-stage extraction test.

INDUSTRIAL APPLICABILITY

From the above it can be seen that a new and novel method is presented for reducing the volume of radioactively contaminated plastic materials. This method has advantageous uses in industrial environments, teaching environments, research and development environments, medical environments, and testing environments, to name just a few.

Other objects and advantages of the invention can be obtained through a review of the claims and Figures. It is to be understood that other embodiments of the invention can be devised which come within the scope and breadth of the claims appended hereto.

We claim:

1. A method of removing low level radioactive contaminants from plastic materials contaminated in a radioactively contaminated environment in order to concentrate the radioactive contaminants for more compact disposal in a low level radioactive waste disposal facility and in order to be able to recycle the plastic materials or dispose of the plastic materials in a conventional manner without restrictions associated with radioactivity contaminated plastic materials, comprising the steps of:

dissolving the plastic materials in an organic solvent to produce a feed stream;

contacting the feed stream in a solvent extraction device with an aqueous solvent to cause the contaminants to transfer from an organic phase to an aqueous phase.

2. The method of claim 1 wherein the dissolving step includes the step of:

using an aromatic compound to dissolve the plastic materials.

3. The method of claim 1 wherein the dissolving step includes the step of:

using an aliphatic hydrocarbon to dissolve the plastic materials.

4. The method of claim 1 wherein the dissolving step includes the step of:

using a chlorinated hydrocarbon to dissolve the plastic material.

5. The method of claim 1 wherein the dissolving step includes the step of:

using a ketone to dissolve the plastic material.

6. The method of claim 1 including the step of:

recovering the organic solvent from the dissolved plastic after the contaminants have been removed by the solvent extraction device of the contacting step.

7. The method of claim 1 including the step of:

segregating the plastic material from other nonplastic material prior to the dissolving step.

8. The method of claim 1 including the step of:

shredding the plastic material prior to the dissolving step.

9. The method of claim 1 including the step of:

using methyl isobutyl ketone to dissolve the plastic materials.

10. The method of claim 1 including the step of:

using methyl ethyl ketone to dissolve the plastic materials.

11. The method of claim 1 including the step of:

using cyclohexane to dissolve the plastic materials.

12. The method of claim 1 including the step of:

using a solvent extraction column with the feed stream from the dissolving step entering the bottom of the column and the aqueous solvent entering the top of the column.

13. The method of claim 1 including the step of:

recovering the organic solvent from the solution of the organic solvent and the plastic material, and recovering the plastic material.

* * * * *